US012573741B2

(12) United States Patent
Kim et al.

(10) Patent No.: US 12,573,741 B2
(45) Date of Patent: Mar. 10, 2026

(54) WIRELESS COMMUNICATION DEVICE SUPPORT ASSEMBLY

(71) Applicant: KMW INC., Hwaseong-si (KR)

(72) Inventors: Duk Yong Kim, Yongin-si (KR); Chi Back Ryu, Hwaseong-si (KR); Min Sik Park, Hwaseong-si (KR); Kyo Sung Ji, Hwaseong-si (KR); In Ho Kim, Yongin-si (KR); Sang Hyo Kang, Hwaseong-si (KR); Min Soo Kim, Hwaseong-si (KR); Hee Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 115 days.

(21) Appl. No.: 18/395,708

(22) Filed: Dec. 25, 2023

(65) Prior Publication Data

US 2024/0127722 A1 Apr. 18, 2024

Related U.S. Application Data

(63) Continuation of application No. PCT/KR2022/008635, filed on Jun. 17, 2022.

(30) Foreign Application Priority Data

Jun. 29, 2021 (KR) ........................ 10-2021-0085125
Jun. 29, 2021 (KR) ........................ 10-2021-0085186
Jun. 16, 2022 (KR) ........................ 10-2022-0073387

(51) Int. Cl.
*H01Q 1/12* (2006.01)
*G09F 11/02* (2006.01)
(Continued)

(52) U.S. Cl.
CPC ......... *H01Q 1/1242* (2013.01); *G09F 11/025* (2013.01); *G09F 15/0081* (2013.01);
(Continued)

(58) Field of Classification Search
CPC ...... H01Q 1/12; H01Q 1/1207; H01Q 1/1228; H01Q 1/1242; H01Q 1/246; H01Q 1/42;
(Continued)

(56) References Cited

U.S. PATENT DOCUMENTS 10,355,343 B2 7/2019 Umbert

FOREIGN PATENT DOCUMENTS

CN 110409904 A 11/2019
JP H11-117241 A 4/1999
(Continued)

OTHER PUBLICATIONS

International Search Report mailed Sep. 29, 2022 for International Application No. PCT/KR2022/008203 and its English translation.
(Continued)

*Primary Examiner* — Robert Karacsony
(74) *Attorney, Agent, or Firm* — Insight Law Group, PLLC; Seung Lee

(57) ABSTRACT

A wireless communication device support assembly is disclosed, including a support pole comprising a hollow interior, a first frame having a polygonal shape disposed on top of the support pole, a plurality of wireless communication devices disposed inside the first frame, at least one or more rotational advertising apparatuses controllably elevated in a direction parallel to a longitudinal direction of the support pole, a drive unit configured to elevate or lower the rotational advertising apparatus, and a plurality of lift ropes having first ends connected with tops of the rotational advertising apparatuses and second ends connected with the drive unit.

19 Claims, 9 Drawing Sheets

(51) Int. Cl.
*G09F 15/00* (2006.01)
*G09F 23/00* (2006.01)
*H01Q 1/24* (2006.01)
*H01Q 1/44* (2006.01)
*G09F 9/30* (2006.01)

(52) U.S. Cl.
CPC ........... *G09F 23/00* (2013.01); *H01Q 1/1228* (2013.01); *H01Q 1/246* (2013.01); *H01Q 1/44* (2013.01); *G09F 9/30* (2013.01)

(58) Field of Classification Search
CPC .. H01Q 1/428; H01Q 1/44; G09F 7/18; G09F 7/20; G09F 7/205; G09F 2007/1834; G09F 2007/1839; G09F 2007/1843; G09F 9/30; G09F 9/302; G09F 11/02; G09F 11/025; G09F 15/0006; G09F 15/0012; G09F 15/0018; G09F 15/0075; G09F 15/0081; G09F 2017/0025
See application file for complete search history.

(56) References Cited

FOREIGN PATENT DOCUMENTS

| | | | |
|---|---|---|---|
| JP | 2003-508802 | A | 3/2003 |
| JP | 2007-57710 | A | 3/2007 |
| JP | 2007-320748 | A | 12/2007 |
| JP | 2015-106049 | A | 6/2015 |
| JP | 2019-532351 | A | 11/2019 |
| KR | 20-0262871 | Y1 | 3/2002 |
| KR | 10-2010-0081091 | A | 7/2010 |
| KR | 10-1080126 | B1 | 11/2011 |
| KR | 10-2018-0109342 | A | 10/2018 |
| WO | 01/16926 | A1 | 3/2001 |

OTHER PUBLICATIONS

Non-final Office Action mailed Dec. 3, 2024 from the Japanese Patent Office for Japanese Application No. 2023-575717 and its English translation.
Office Action mailed on May 27, 2025 from Japanese Patent Office for Application No. 2023-575717 and its English translation.
European Search Report dated May 19, 2025 from European Patent Office for Application No. 22833475.1.

WIRELESS COMMUNICATION DEVICE SUPPORT ASSEMBLY

CROSS-REFERENCE TO RELATED APPLICATIONS

This application is a continuation application of International Application No. PCT/KR2022/008635, filed Jun. 17, 2022, which claims the benefit of Korean Patent Application Nos. 10-2021-0085125 filed on Jun. 29, 2021; 10-2021-0085186 filed on Jun. 29, 2021; and 10-2022-0073387 filed on Jun. 16, 2022, in the Korean Intellectual Property Office, the disclosures of which are incorporated herein in their entirety by reference.

TECHNICAL FIELD

The present disclosure relates to a support assembly for a wireless communication device or radio communication device.

BACKGROUND

The statements in this section merely provide background information related to the present disclosure and do not necessarily constitute prior art.

Wireless or radio communication devices used to transmit and receive wireless signals are commonly installed in an outdoor environment, such as on the roof of a building.

Radio communication devices installed in outdoor environments are often not harmonized with the appearance of surrounding buildings or roads, thereby disfiguring the surrounding views. Accordingly, various studies have been conducted on how to install a large number of radio communication devices in an outdoor environment without spoiling the surrounding aesthetics.

Some studies have proposed a method of placing a display device that displays a screen such as an advertisement around the radio communication device so that the radio communication device is inconspicuous to sight, but it has the disadvantage of impairing the radiation performance of the radio communication device with electromagnetic waves or other effects from the display device.

DISCLOSURE

Technical Problem

Accordingly, the present disclosure in at least one embodiment seeks to provide a support assembly for a radio communication device, which can allow the radio communication device to be positioned within an advertising device while maintaining the radiating capabilities of the radio communication device.

The problems to be solved by the present disclosure are not limited to the issues mentioned above, and other unmentioned problems will be clearly understood by those skilled in the art from the following description.

SUMMARY

According to at least one embodiment, the present disclosure provides a wireless communication device support assembly including a support pole comprising a hollow interior, a first frame having a polygonal shape disposed on top of the support pole, a plurality of wireless communication devices disposed inside the first frame, at least one or more rotational advertising apparatuses controllably elevated in a direction parallel to a longitudinal direction of the support pole, a drive unit configured to elevate or lower the rotational advertising apparatus, and a plurality of lift ropes having first ends connected with tops of the rotational advertising apparatuses and second ends connected with the drive unit.

Advantageous Effects

In at least one embodiment, the present disclosure can provide a support assembly for a radio communication device for allowing the radio communication device to be placed inside a rotational-slat billboard/sign having predetermined gaps without generating electromagnetic waves while maintaining the radiating function.

Figure 1:
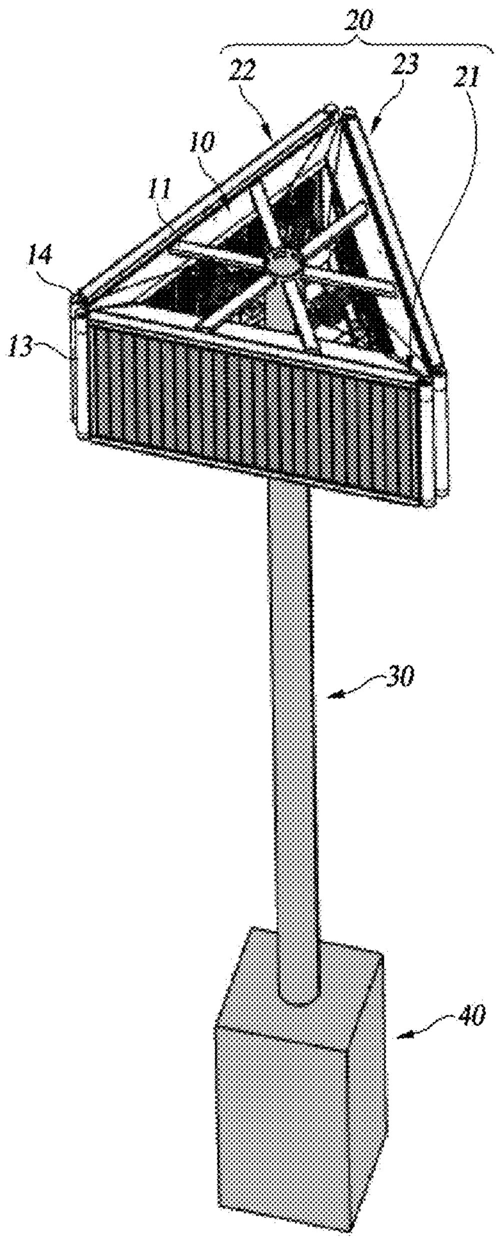
FIG. 1 is a perspective view of a radio communication device support assembly according to at least one embodiment of the present disclosure.

| REFERENCE NUMERALS | |
|---|---|
| 10: frame | 20: rotational-slat billboard/sign |
| 30: support pole | 40: cover |
| 50: drive unit | 60: radio communication device |
| 70: lift rope | |

DETAILED DESCRIPTION

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary.

Figure 2:
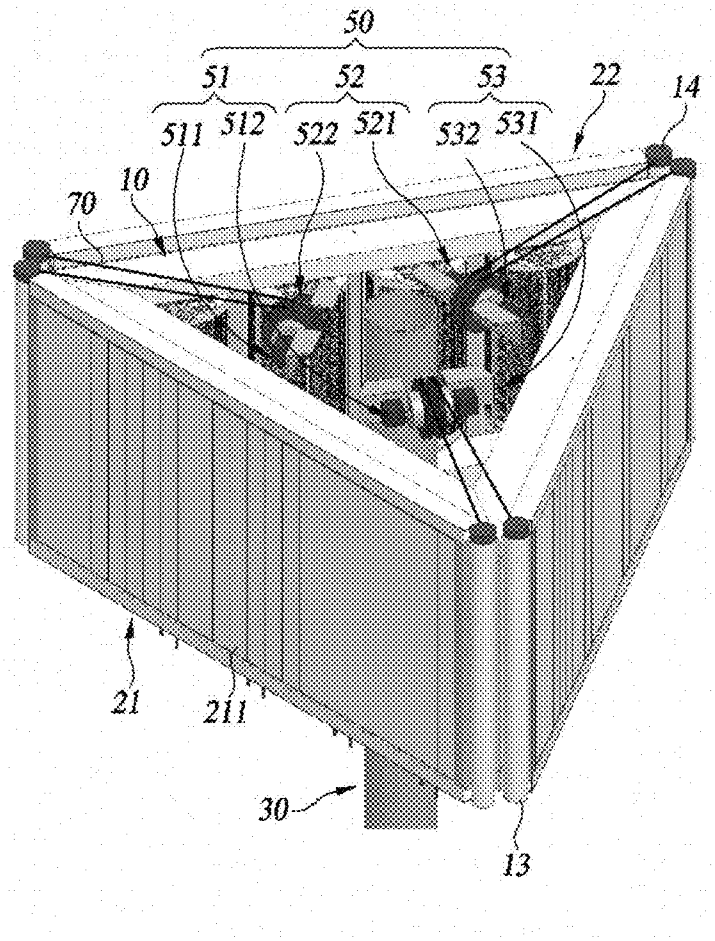
FIG. 2 is a perspective view of the top of the radio communication device support assembly according to at least one embodiment of the present disclosure.
Figure 3:
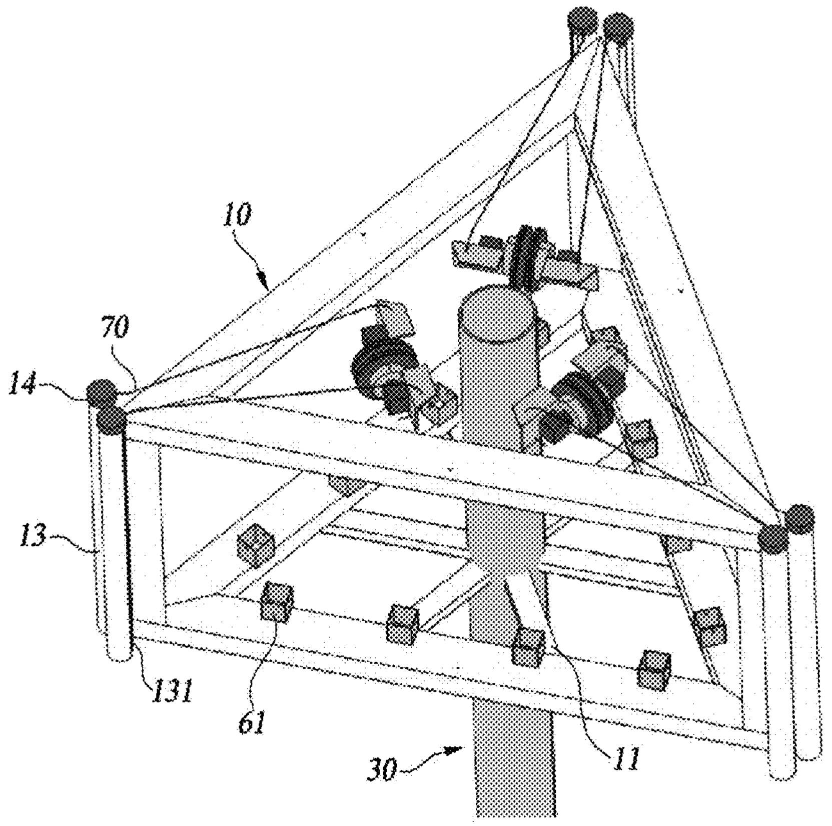
FIGS. 3 through 5 are top perspective views of the radio communication device support assembly according to at least one embodiment of the present disclosure, with some of the components omitted.
Figure 4:
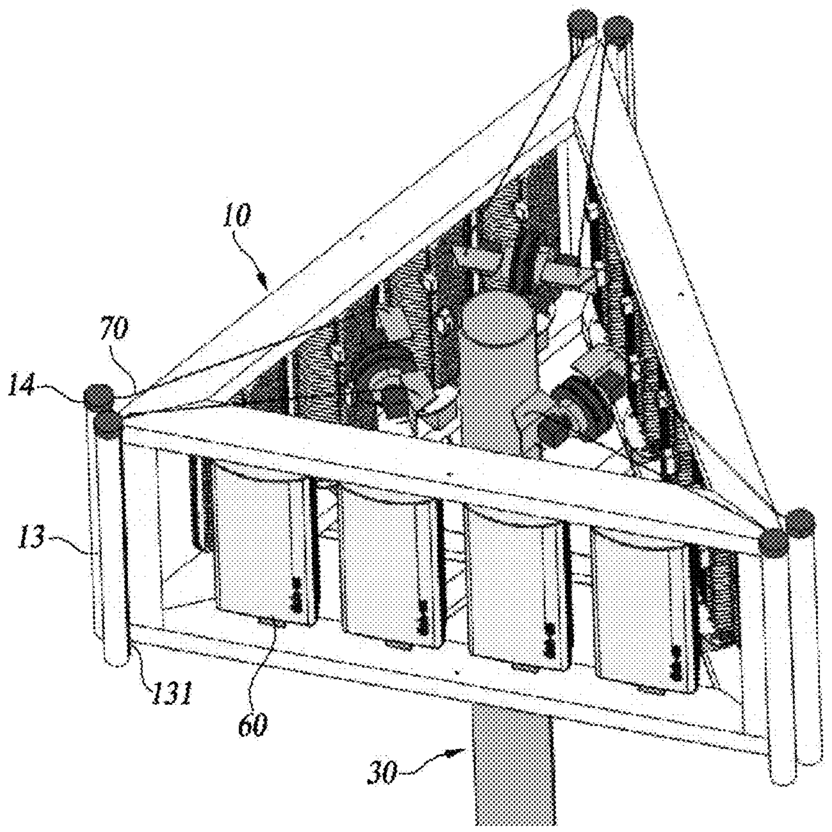
Figure 5:
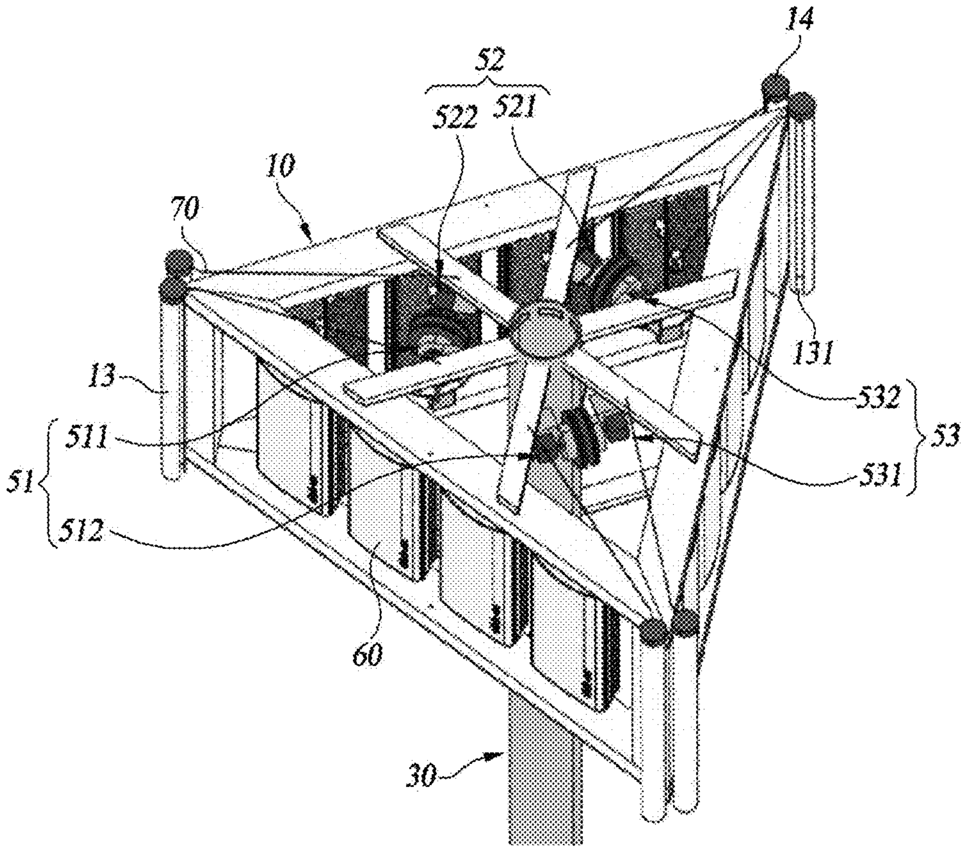

FIG. 1 is a perspective view of a radio communication device support assembly according to at least one embodiment of the present disclosure. FIG. 2 is a perspective view of the top of the radio communication device support assembly according to at least one embodiment of the present disclosure. FIGS. 3 through 5 are top perspective views of the radio communication device support assembly according to at least one embodiment of the present disclosure, with some of the components omitted.

In FIG. 2, the component of supports 11 is omitted. FIGS. 3 through 5 are illustrated to describe the process of adding components to a first frame 10. FIG. 3 illustrates the first frame 10 and a drive unit 50 added to the top of a support pole 30. FIG. 4 is an illustration of a plurality of radio communication devices 60 added to the support pole 30 in FIG. 3. FIG. 5 is an illustration of further supports 11 to FIG. 4.

Referring to FIGS. 1 through 5, the radio communication device support assembly 1 may include all or part of a first frame 10, a rotational-slat sign 20, a support pole 30, a cover 40, a drive unit 50, a plurality of radio communication devices 60, and lift ropes 70.

An operation unit may be disposed inside the cover 40. A user may utilize the operation unit disposed on the cover 40 to control the drive unit 50 to control the operation of advertisement columns 211 of the rotational-slat sign 20 and/or to control the elevating (inclusive of lowering) of the rotational-slat sign 20. The operation unit may be protected from external impact by the cover 40 which may be configured to be retractable.

The support pole 30 may be installed on the roof of a building, a wall of a building, or the like, and may provide on its top a space for the first frame 10 to be installed. The interior of the support pole 30 may be formed as a hollow space where wires may pass through the interior thereof to connect with electronic equipment disposed in the first frame 10, such as one or more motors of the drive unit 50. Thus, a user can control the operation of the drive unit 50 by using a control device on the ground.

On the top of the support pole 30, the first frame 10 is installed. The first frame 10 may have an interior receiving space where a plurality of radio communication devices 60 are disposed. The first frame 10 may have the shape of a polygonal column, in particular a triangular prism. A center portion of the top surface of the first frame 10 is formed to have an opening.

The plurality of radio communication devices 60 may be spaced apart at predetermined intervals and may be disposed in the interior of the first frame 10 facing the sides of the first frame 10. Where the first frame 10 has the shape of an equilateral triangular column as shown in FIGS. 1 to 5, the plurality of radio communication devices 60 may be spaced apart at predetermined intervals in a direction parallel to the sides of the first frame 10. For example, on each side of the equilateral triangle-shaped first frame 10, four radio communication devices 60 may be spaced apart by a predetermined distance in a direction parallel to the relevant side of the first frame 10.

Thus, the radio communication devices 60 facing outwardly on each side of the first frame 10 may radiate signals in a range of about 120 degrees, for a total range of 360 degrees around the first frame 10. The number of radio communication devices 60 that may be disposed a predetermined distance apart in a direction parallel to the sides of the first frame 10 may vary depending on the size of the first frame 10.

The first frame 10 may have a plurality of radio communication device mounts 61 for mounting the radio communication devices 60.

The first frame 10 may be fixedly disposed on top of the support pole 30 and may be rigidly fixed against its movement by a plurality of supports 11. The plurality of supports 11 may be disposed on a top and/or bottom surface of the first frame 10 to integrally couple the support pole 30 and the first frame 10. The coupling between the support pole 30, the first frame 10, and the plurality of supports 11 may be made by way of, but not limited to, welding.

The rotational-slat sign 20 may be arranged with a plurality of polygonal (e.g., triangular) advertisement slats or columns 211. The advertisement columns 211 may include advertising content on each of the polygonal faces. For example, when the advertisement column 211 is triangular, the first to third sides may include different ad content. The advertisement columns 211 rotate about their respective center axes in the longitudinal direction thereof, and they may be spaced apart at a predetermined distance so that each advertisement columns 211 does not contact an adjacent advertisement column 211 when it rotates.

The plurality of advertisement columns 211 may have the first side faces rotated outwardly of a second frame to externally display the first advertising content, the second side faces rotated outwardly of the second frame to externally display the second advertising content, and the third side faces rotated outwardly of the second frame to externally display the third advertising content.

Since the rotational-slat sign 20 does not involve an electronic device such as an LED or LCD, it does not interfere with the radiation capabilities of the radio communication device 60 disposed within the first frame 10. Additionally, a predetermined gap present between the advertisement columns 211 of the rotational-slat sign 20 does not interfere with the plurality of radio communication devices 60 even with the radio communication device 60 placed within the first frame 10. Unlike advertising devices that utilize LEDs or LCDs, when using the rotational-slat sign 20, the radio communication device 60 can be placed inside the first frame 10 so that the radio communication device 60 is not visible from the outside.

On the other hand, in case an advertising apparatus using an LED or LCD is placed on the side of the first frame 10, the radio communication devices 60 should be placed on the top of the first frame 10 rather than inside thereof, as the radio communication devices 60 may be interfered with by the electronic devices and reduce the radiation capabilities of the radio communication devices 60. If the radio communication devices 60 were placed on the top of the first frame 10, the radio communication devices 60 are still visible from the outside, which may impair the aesthetics of buildings, roads, etc.

The rotational-slat sign 20 may be rotational advertising apparatuses disposed on as many sides as the first frame 10 have. For example, when the first frame 10 has the form of a triangular prism having three sides, first to third rotational advertising apparatuses 21 to 23 may be disposed on the respective sides. However, it is not necessary that the rotational-slat sign 20 provide the rotational advertising apparatuses disposed on all of the sides, but it may provide at least one or more selected sides thereof with the rotational advertising apparatus(es) 20. Hereinafter, a case will be described as an example where the first frame 10 has the form of a triangular prism, and the first to third rotational advertising apparatuses 21 to 23 are arranged on each side.

The first to third rotational advertising apparatuses 21 to 23 are each configured to be elevated in a direction parallel to the longitudinal direction of the support pole 30. The first to third rotational advertising apparatuses 21 to 23 are each configured to move from a first position, which is a position covering a side of the first frame 10, to a second position, which is lower than the first position.

Each of the first to third rotational advertising apparatuses 21 to 23 may be moved independently. For example, the first to third rotational advertising apparatuses 21 to 23 may be arranged to in isolation from each other.

Some portions of the top of the rotational-slat sign 20 may be connected to an end of at least one or more lift ropes 70. The other end of at least one or more lift ropes 70 is connected to the drive unit 50. When the drive unit 50 is actuated, the lift rope 70 can be used to elevate the rotational-slat sign 20. The drive unit 50 may be controlled by a separate control unit.

As shown in FIGS. 1 through 5, the first end of each of the two lift ropes 70 may be connected to each of the two top ends of each rotational advertising apparatus of the rotational-slat sign 20, but the present disclosure is not limited to this configuration. The following illustrates an example case in which two lift ropes 70 are connected to the top two ends of each rotational advertising apparatus of the rotational-slat sign 20.

The first frame 10 may be formed with two fixing rods 13 for each rotational advertising apparatus of the rotational-slat sign 20. The fixing rods 13 may be formed as a cylindrical hollow structure. The fixture rods 13 are formed with slits 131 in the direction in which the rotational-slat sign 20 is elevated. When the rotational advertising apparatus of the rotational-slat sign 20 is elevated between the first position and the second position, the elevating and lowering directions may be guided by the slit 131. For example, when the rotational advertising apparatus of the rotational-slat sign 20 is elevated from the second position to the first position, it may be inserted into the slit 131 so that at least some portions of the left side and the right side of the rotational advertising apparatus of the rotational-slat sign 20 are disposed inside the fixture rods 13. Thus, when the rotational advertising apparatus of the rotational-slat sign 20 is in the first position, its movement may be fixed from external impact. In addition, the slits 131 in the fixture rods 13 may guide the elevating and lowering directions of the rotational advertising apparatus of the rotational-slat sign 20.

The upper end of the fixture rod 13 is opened. Rollers 14 are disposed on the upper ends of the fixture rods 13 which may be disposed to lay the lift ropes 70 connected to the drive unit 50 through the interior of the fixture rods 13. Thus, the lift ropes 70 may be moved through the interior of the fixture rods 13 when the rotational-slat sign 20 is elevated between the first and second positions. In this case, the top two ends of the rotational advertising apparatus of the rotational-slat sign 20 connected with the lift rope 70 may be positioned inside the fixture rod 13 when the rotational advertising apparatus of the rotational-slat sign 20 is in the first position.

There may be as many drive units 50 as there are rotary advertising apparatuses of the rotational-slat sign 20. For example, referring to FIG. 2, the first rotary advertising apparatus 20 is elevated by the first drive unit 50, the second rotary advertising apparatus 20 is elevated by the second drive unit 50, and the third rotary advertising apparatus 20 is elevated by the third drive unit 50. The first to third drive units 51 to 53 may include, but not limited to, two motors each. The number of motors that the first to third drive units 51 to 53 have may vary depending on the number of lift ropes 70 connected to the first to third rotary advertising apparatuses 21 to 23.

The motors disposed in each of the drive units provide controlled torque for elevating and lowering the rotational-slat sign 20. The motors may be controlled by control signals from the control unit.

The drive unit 50 may be coupled and fixed to any one of the first frame 10, the supports 11, and the support pole 30.

The separate control unit may control the first to third drive units 51 to 53 independently. Therefore, when only the first rotational advertising apparatus 21 is to be elevated, the control unit may control only the motion of the first drive unit 51 to elevate and lower the first rotational advertising apparatus 21.

When a user wishes to change the advertisement content of the rotational-slat sign 20, the plurality of advertisement columns 211 needs to be replaced manually, for which the user may use the drive units 50 to easily change the advertisement content of the rotational-slat sign 20 by lowering the rotational-slat sign 20 to the second position.

A pivoting unit (not shown) may be disposed at the top or bottom of each advertisement column 211. The control unit may control the pivoting unit so that any one of the first to third sides of the advertisement column 211 faces outwardly of the rotational-slat sign 20.

Figure 6:
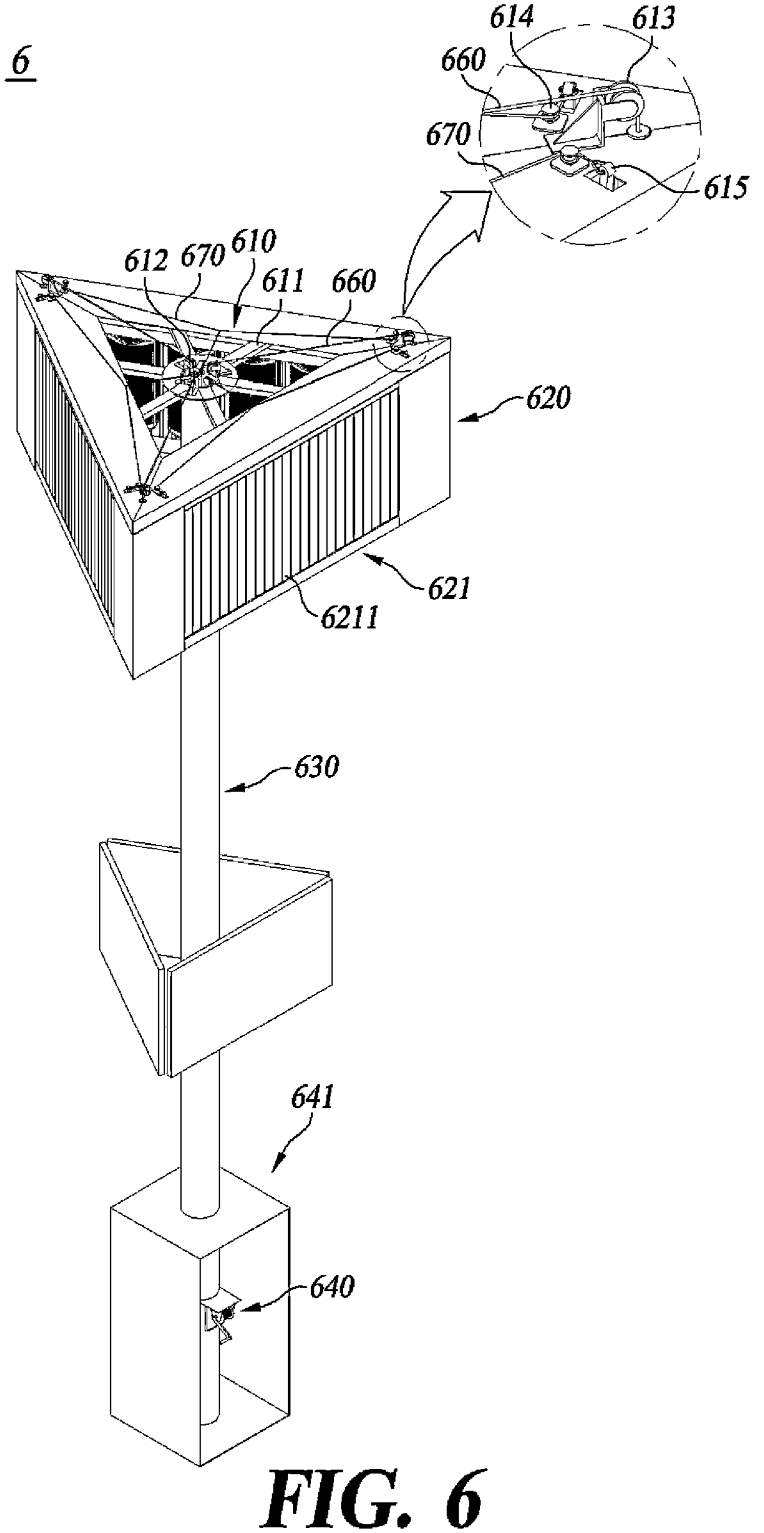
FIG. 6 is a perspective view of a radio communication device support assembly according to another embodiment of the present disclosure.
Figure 7:
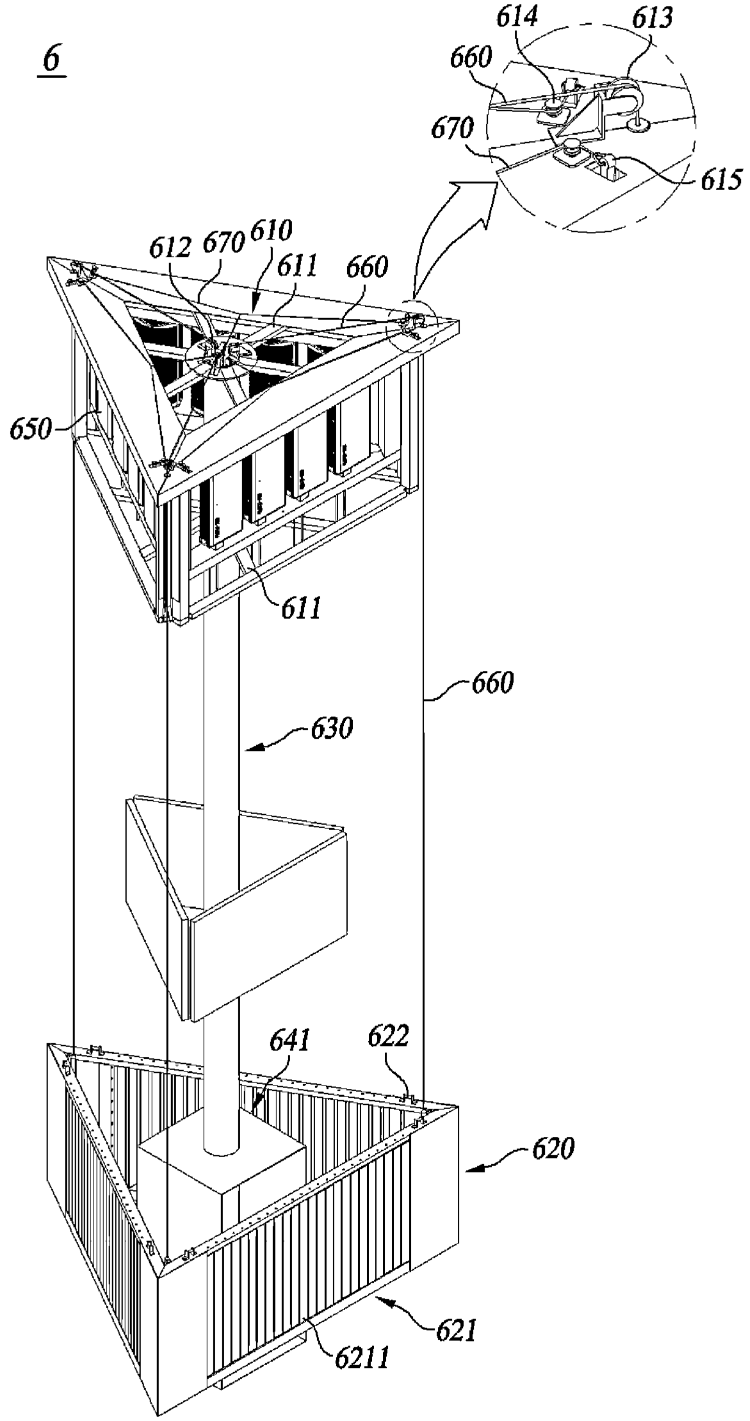
FIG. 7 is a diagram illustrating the elevating and lowering of a second frame of the radio communication device support assembly according to another embodiment of the present disclosure.
Figure 8:
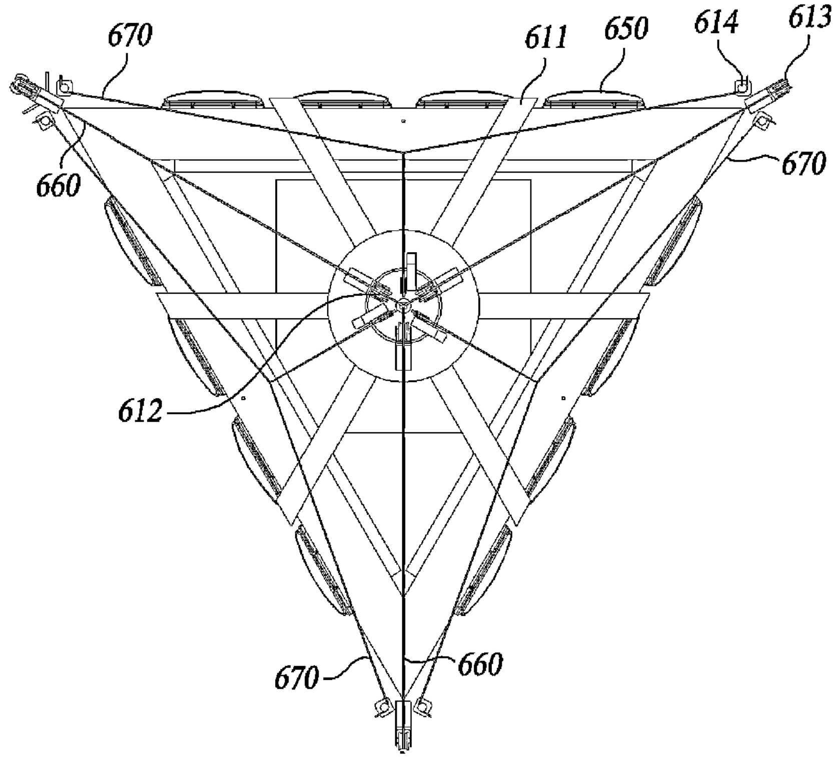
FIG. 8 is a top view of the radio communication device support assembly according to another embodiment of the present disclosure.
Figure 9:
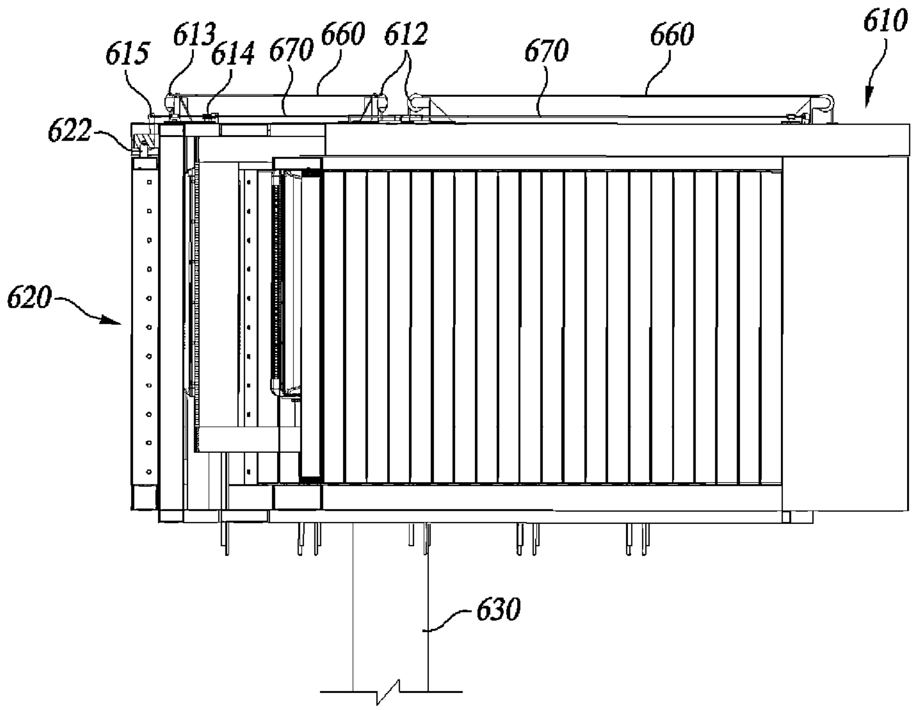
FIG. 9 is an enlarged view illustrating a secured coupling of the first and second frames.

FIG. 6 is a perspective view of a radio communication device support assembly according to another embodiment of the present disclosure. FIG. 7 is a diagram illustrating the elevating and lowering of a second frame of the radio communication device support assembly according to another embodiment of the present disclosure. FIG. 8 is a top view of the radio communication device support assembly according to another embodiment of the present disclosure. FIG. 9 is an enlarged view illustrating a secured coupling of the first and second frames.

In FIG. 8, some portions of the top surface of a first frame 610 is omitted to illustrate the arrangement of a plurality of radio communication devices 650.

Referring to FIGS. 6 and 7, a radio communication device support assembly 6 may include all or part of a first frame 610, a second frame 620, a support pole 630, a cover 641, a plurality of radio communication devices 650, a drive unit 640, lift ropes 660, and safety ropes 670.

The support pole 630 may be mounted on the roof of a building, a wall of a building, or the like, and may provide on its top a space for the first frame 610 and second frame 620 to be mounted. The interior of the support pole 630 may be formed as a hollow space, allowing electric wires or lift ropes 660 to pass through the interior thereof to connect with the first frame 610 and/or the second frame 620.

On top of the support pole 630, the first frame 610 is installed. The first frame 610 may have an interior receiving space where a plurality of radio communication devices 650 are disposed. The first frame 610 may be polygonal, particularly the shape of a triangular prism. A center portion of the top surface of the first frame 610 is formed to have an opening.

The plurality of radio communication devices 650 may be spaced apart at predetermined intervals and may be disposed in the interior of the first frame 610 facing the sides of the first frame 610. When the first frame 610 has the shape of an equilateral triangular column as shown in FIG. 8, the plurality of radio communication devices 650 may be spaced apart at predetermined intervals in a direction parallel to the sides of the first frame 610. For example, on each side of the equilateral triangle-shaped first frame 610, four radio communication devices 650 may be spaced apart by a predetermined distance in a direction parallel to the relevant side of the first frame 10. Thus, the radio communication devices 650 facing outwardly on each side of the first frame 610 may radiate signals in a range of about 120 degrees, for a total range of 360 degrees.

The first frame 610 may be fixedly disposed on top of the support pole 630 and may be rigidly fixed against its movement by a plurality of supports 611. The plurality of supports 611 may be disposed on the top and/or bottom surface of the first frame 610 to integrally couple the support pole 630 and the first frame 610. The coupling between the support pole 630, the first frame 610, and the plurality of supports 611 may be made by way of, but not limited to, welding.

The second frame 620 is configured to be elevated in a direction parallel to the longitudinal direction of the support pole 630. The second frame 620 may have the form of a polygonal column and may have a cross-section conforming to that of the first frame 610. For example, when the first frame 610 has the shape of an equilateral triangular prism as shown in FIG. 6, the second frame 620 may have the corresponding equilateral triangular prism. The second frame 620 may have an open top and may be arranged to wrap around the sides of the first frame 610.

The second frame 620 during elevation may rise until the top of the second frame 620 abuts the bottom of the top surface of the first frame 610. Herein, the position when the second frame 620 is in contact with the bottom of the top surface of the first frame 610 is referred to as a first position, and a position lower than the first position is referred to as a second position.

Connected to the top of the second frame 620 is at least one or more lift ropes 660 for elevating the second frame 620.

The at least one lift rope 660 may have a first end connected to the drive unit 640 and a second end connected to the top of the second frame 620. The lift rope 660 may extend through the interior of the support pole 630, past the top surface of the first frame 610, and connect to the top of the second frame 620. A plurality of rollers 612 and 613 may be disposed in the path that the lift rope 660 passes on the top surface of the first frame 610.

The plurality of rollers 612 and 613 may include a plurality of first rollers 612 disposed at the top of the support pole 630 and a plurality of second rollers 613 disposed at the outer side of the top surface of the first frame 610.

The lift rope 660 may be disposed to extend through the interior of the support pole 630 and toward a vertex of the top surface of the first frame 610. The multiple second rollers 613 may also be correspondingly disposed, each near a vertex of the top surface of the first frame 610. One first roller 612 and one second roller 613 are disposed for each lift rope 660. For example, when the first frame 610 and the second frame 620 have the shape of an equilateral triangular prism, three lift ropes 660 are each connected to the top vertex of the second frame 620. The second roller 613 is disposed near the top vertex of the first frame 610 to allow the lift rope 660 extending through the support pole 630 to be directed to the vertex of the first frame 610.

The second frame 620 may be elevated by the drive unit 640 linked with the lift rope 660, where the drive unit 640 may be, but is not limited to, a motor and may be a manual winch manually operated by a user. Where the drive unit 640 is a manual winch, it is disposed at a lower portion of the support pole 630 because the user at the lower end of the support pole 630 needs to adjust the elevating of the second frame 620. When the drive unit 640 is disposed at the lower portion of the support pole 630, the cover 641 may be further installed to protect the drive unit 640 from external impact.

The drive unit 640 may be an electronic device that is automatically driven by an external control input, such as a motor, wherein the drive unit 640 may be disposed at the bottom of the support pole 630, disposed at the top of the support pole 630, or disposed anywhere in between. The drive unit 640, which is composed of a motor, may be electrically connected to a separate control unit by using wires placed in the interior space of the support pole 630. In this case, electrical signals received from the control unit can operate the drive unit 640 to elevate and lower the second frame 620.

The first frame 610 may further include anchors 615 and 622 to allow the second frame 620 to be fixed in the first position. The anchors 615 and 622 include the first anchors 615 on the first frame 610 and the second anchors 622 on the second frame 620.

When the second frame 620 is in the first position, it can be secured by engaging the first anchors 615 and engaging the second anchors 622 to prevent a possible failure at the lift ropes pulling the second frame 620 and eliminate chances of the second frame 620 to fall. The second anchors 622 may be disposed on some portions of the top of the second frame 620, and the first anchors 615 may be disposed in positions corresponding to the second anchors 622.

The first anchors 615 may be linked with safety ropes 670. The safety ropes 670 may be disposed through the interior of the support pole 630. When the user wishes to lower the second frame 620, the user may first unlock the second frame 620 by pulling the safety ropes 670 toward the support pole 630 before controlling the lift ropes 660. For example, the user may pull the safety ropes 670 to unlock the second frame 620 and then lower the second frame 620 by using the drive unit 640. The safety ropes 670 may be supported by anchoring rollers 614 and connected to the first anchors 615.

On each side of the second frame 620, a rotational-slat sign 621 may be placed. The rotational-slat sign 621 may be arranged with a plurality of polygonal (e.g., triangular) advertisement slats or columns 6211. The advertisement columns 6211 may each include advertising content on each of its faces. For example, when the advertisement column 6211 is a triangular prism, the first to third sides may each include different ad content. The advertisement columns 6211 rotate about their center axes in the longitudinal direction thereof and may be spaced apart by a predetermined distance such that each advertisement column 6211 does not contact an adjacent advertisement column 6211 when it rotates.

When the advertisement columns 6211 are rotated such that when the first sides face the outer side of the second frame, a first ad content may be displayed externally, when the second sides face the outer side of the second frame, a second ad content may be displayed externally, and when the third sides face the outer side of the second frame, a third ad content may be displayed externally.

Since the rotational-slat sign 621 does not involve an electronic device such as an LED or LCD, it does not interfere with the radiation capabilities of the radio communication devices 650 disposed within the first frame 610. Additionally, a predetermined gap present between the advertisement columns 6211 of the rotational-slat sign 621 does not interfere with the plurality of radio communication devices 650 even with the radio communication device 650 placed within the first frame 610. Unlike advertising devices that utilize LEDs or LCDs, when using the rotational-slat sign 621, the radio communication device 650 can be placed inside the first frame 610 so that the radio communication device 650 is not visible from the outside.

On the other hand, in case an advertising apparatus using an LED or LCD is placed on the side of the second frame 620, the radio communication devices 650 should be placed on the top of the first frame 610 rather than inside thereof, as the radio communication devices 650 may be interfered with by the electronic devices and reduce the radiation capabilities of the radio communication devices. If the radio communication devices 650 were placed on the top of the first frame 610, the radio communication devices 650 are still visible from the outside, which may impair the aesthetics of buildings, roads, etc.

When a user wishes to change the advertisement content of the rotational-slat sign 621, the plurality of advertisement columns 6211 needs to be replaced manually, for which the user may use the drive unit 640 to easily change the advertisement content of the rotational-slat sign 621 by lowering the second frame 620 to the second position.

A pivoting unit (not shown) may be disposed at the top or bottom of each of the advertisement columns 6211. A control device may control the pivoting unit such that any one of the first to third sides of each advertisement column 6211 faces outwardly of the second frame 620.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A wireless communication device support assembly, comprising:
- a support pole comprising a hollow interior;
- a first frame having a polygonal shape disposed on top of the support pole;
- a plurality of wireless communication devices disposed inside the first frame;
- at least one or more rotational advertising apparatuses controllably elevated in a direction parallel to a longitudinal direction of the support pole;
- a drive unit configured to elevate or lower the rotational advertising apparatus; and
- a plurality of lift ropes having first ends connected with tops of the rotational advertising apparatuses and second ends connected with the drive unit.

2. The wireless communication device support assembly of claim 1, wherein the one or more rotational advertising apparatuses are each disposed on at least some portion of a side of the first frame.

3. The wireless communication device support assembly of claim 2, further comprising:
- fixture rods each configured to be placed over at least some portions of a left side and a right side of the rotational advertising apparatus when positioned to cover the sides of the first frame.

4. The wireless communication device support assembly of claim 2, further comprising:
- fixture rods having slits formed in a direction in which the rotational advertising apparatus is elevated and lowered.

5. The wireless communication device support assembly of claim 4, wherein the rotational advertising apparatuses are configured to be guided and elevated by the slits.

6. The wireless communication device support assembly of claim 1, wherein the plurality of lift ropes have the first ends that are connected to top ends of the rotational advertising apparatus.

7. The wireless communication device support assembly of claim 1, further comprising:
- a plurality of rollers disposed on a top surface of the first frame and configured to be in contact with the plurality of lift ropes.

8. The wireless communication device support assembly of claim 1, wherein:
- wherein the first frame takes a form of a triangular prism.

9. The wireless communication device support assembly of claim 1, wherein the rotational advertising apparatus comprises:
- a plurality of advertisement slats or columns and a rotating drive unit for rotating the plurality of advertisement columns.

10. The wireless communication device support assembly of claim 9, further comprising:
- a predetermined spacing formed between the plurality of advertisement columns.

11. The wireless communication device support assembly of claim 1, wherein the wireless communication devices are disposed at predetermined intervals parallel to a side of the first frame.

12. The wireless communication device support assembly of claim 1, wherein the at least one or more rotational advertising apparatuses are configured to be elevated and lowered between a first position covering a side of the first frame and a second position that is lower than the first position.

13. The wireless communication device support assembly of claim 1, further comprising:
- a second frame having an open top and a polygonal shape and configured to be elevated and lowered in a direction parallel to the longitudinal direction of the support pole, wherein the rotational advertising apparatuses are each disposed on at least some portion of a side of the second frame.

14. The wireless communication device support assembly of claim 13, wherein the second frame conforms in cross-sectional shape to the first frame.

15. The wireless communication device support assembly of claim 13, further comprising:
- a plurality of first rollers disposed on top of the support pole; and
- a plurality of second rollers disposed at top vertices of the first frame, wherein a number of the first rollers as well as a number of the second rollers correspond to a number of the lift ropes.

16. The wireless communication device support assembly of claim 13, wherein the second frame is configured to be elevated and lowered between a first position wherein a top surface of the second frame abuts a bottom surface of the first frame and a second position that is lower than the first position.

17. The wireless communication device support assembly of claim 16, further comprising:

anchors configured to secure engagement of the first frame with the second frame when the second frame is in the first position.

18. The wireless communication device support assembly of claim 17, wherein the anchors each have at least a portion protruding from the top surface of the first frame, and wherein the anchors further comprise securing ropes each disposed to connect a free end of each of the anchors, the securing ropes being routed through an interior of the support pole and past the top surface of the first frame.

19. The wireless communication device support assembly of claim 18, wherein when the second frame is in the first position, a secure engagement between the first frame and the second frame is released by pulling the securing ropes toward the support pole.

* * * * *